United States Patent [19]

Suggs et al.

[11] 4,310,557
[45] Jan. 12, 1982

[54] FOOD EMULSIFIERS

[75] Inventors: James L. Suggs, Greeneville; Dan F. Buck, Kingsport; Howard K. Hobbs, Blountville, all of Tenn.

[73] Assignee: Eastman Kodak Company, Rochester, N.Y.

[21] Appl. No.: 211,978

[22] Filed: Dec. 1, 1980

[51] Int. Cl.³ .............................................. A21D 2/16
[52] U.S. Cl. ......................................... 426/96; 426/98; 426/564; 426/566; 426/571; 426/572; 426/549; 426/496; 426/653; 426/654; 426/570
[58] Field of Search .............. 252/351, 358; 426/654, 426/96, 98, 411, 564, 566, 570, 571, 572, 653, 549, 496

[56] References Cited

U.S. PATENT DOCUMENTS

| | | | |
|---|---|---|---|
| 3,248,229 | 4/1966 | Pader et al. | 426/572 |
| 3,369,907 | 2/1968 | Knightly | 426/549 |
| 3,453,116 | 7/1969 | Freund | 426/654 |
| 3,843,817 | 10/1974 | Swicklik | 426/654 |
| 3,958,033 | 5/1976 | Sims et al. | 426/654 |
| 4,137,338 | 1/1979 | Gawrilow | 426/654 |
| 4,159,952 | 7/1979 | Jackson | 426/654 |
| 4,229,480 | 10/1980 | Suggs et al. | 426/654 |

*Primary Examiner*—Jeanette M. Hunter
*Attorney, Agent, or Firm*—John F. Stevens; Daniel B. Reece, III

[57] ABSTRACT

Disclosed are emulsifiers useful in food products such as cakes, icings, cream fillings, whipped toppings, etc. The emulsifiers comprise a blend of monoglycerides, propylene glycol monoesters and an alkali metal salt of a fatty acid. The emulsifiers are essentially totally active and do not require the use of a carrier.

8 Claims, No Drawings

FOOD EMULSIFIERS

BACKGROUND OF THE INVENTION

1. Field of the Invention

This invention relates generally to food emulsifiers, and more specifically this invention relates to dry powdered emulsifiers which are essentially totally active and can be added directly to foods without first mixing with a carrier.

2. Description of the Prior Art

It is known to use aerating emulsifiers in foods to improve texture by lowering the density. For example, emulsifiers are used in connection with the baking of various products to provide improvement in the structural characteristics of the baked goods such as grain, texture, softness and volume. Also, some emulsifiers improve the handling characteristics or machineability of the batter for the baked goods. These emulsifiers depend on the addition of a diluent or carrier because they are not active emulsifiers and aerating agents unless they are preblended with a carrier such as water, fats, oils, etc. The use of such carriers is undesirable for several obvious reasons. Handling of the concentrated powdered emulsifier is preferred to handling the diluted emulsifier. Also, flavor is often affected by carriers.

Patents of interest in this field include U.S. Pat. No. 3,370,958 which deals with succinylated monoglyceride and its use in combination with other food emulsifiers in the presence of fats or oils used in baking. U.S. Pat. No. 3,494,771 relates to adding to emulsifiers a dispersion consisting essentially of (1) a conjointly solidified mixture of propylene glycol monostearate and a monoglyceride, (2) stearoyl lactylic acid, and (3) water. This patent discloses that the components may be melted together to form a molten blend, which is then spray chilled to form a beadlet product. It is also known to blend propylene glycol monoesters, monoglycerides and succinylated monoglycerides, and to subsequently form a powder therefrom which must be melted in a carrier to be useful as an emulsifier.

According to the present invention, there is provided a composition which is particularly useful as an emulsifier for food products. Such products have low density and good volume when used with the emulsifier described herein. The emulsifiers according to the present invention are in particulate form and are essentially totally active (i.e., do not contain diluents or carriers) and can be added directly to food products such as cake batter, icing, whipped toppings, cream fillings, without first preblending with a component of the food or by the addition of a carrier.

DISCLOSURE OF THE INVENTION

The composition according to this invention is in particular form and the particles comprise a homogeneous blend of (a) about 20-40% by weight (preferably about 25-35%) of monoglycerides having an iodine value of about 2-15, (b) about 40-70% by weight (preferably about (50-60%) of propylene glycol monoesters, and (c) about 5-20% by weight (preferably about 12-18%) of an alkali metal salt of at least one fatty acid having 8-22 carbon atoms.

The monoglycerides having an iodine value of about 2-15 have the general formula

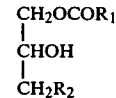

wherein $R_1$ is the residue of a straight chain fatty acid having from 8 to 22 carbon atoms and $R_2$ is OH or H. They are prepared by reacting glycerine with straight chain fatty acids such as those found in vegetable oils and animal fats having from 8 to 22 carbon atoms, and saturated to an extent to result in an iodine value of about 2-15. Such monoglycerides are commercially available, for example, Myverol 18-06 monoglycerides, from Eastman Chemical Products, Inc. The monoglycerides may be made by esterifying various fatty acids, and then blending to obtain the desired iodine number. On the other hand, acids with the proper degree of saturation may be selected to result in an iodine value of about 2-15.

The propylene glycol monoesters useful in accordance with the present invention have the general formula

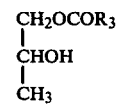

wherein $R_3$ is the residue of a straight chain saturated fatty acid having 8 to 22 carbon atoms. Preferably, $R_3$ is the residue of stearic acid, palmitic acid or a blend thereof. The propylene glycol monoesters are prepared by reacting propylene glycol with straight chain fatty acids such as those found in vegetable oils and animal fats having from 8 to 22 carbon atoms. Preferred monoesters include Myverol P-06 distilled propylene glycol monoesters, a product of Eastman Chemical Products, Inc.

Alkali metal salts of fatty acids having 8-22 carbon atoms are well known and available commercially. Potassium and sodium palmitate, and potassium and sodium stearate are examples of suitable salts. Potassium stearate is preferred.

As a practical matter, the monoglycerides and propylene glycol monoesters referred to above may contain diesters, triesters, unreacted material, and the like. It is preferred, however, that they be of a purity of at least 60%. Such compositions conventially contain such material even though they are commonly referred to in the art as monoglycerides and monoesters.

The monoglycerides and monoesters of this invention are made in accordance with well-known procedures. One conventional procedure is the direct esterification of one or more fatty acids with glycerol or propylene glycol followed preferably by distillation to obtain a high purity product containing one or more monoester. Other procedures for the preparation of distilled, high purity monoglyceride products are disclosed in U.S. Pat. Nos. 2,634,234; 2,634,278 and 2,634,279, to Kuhrt. Such distilled monoesters products usually contain monoesters at a concentration of at least about 90% by weight.

A preferred saturated monoester is a distilled monoester product made from fully hydrogenated lard with an iodine value in a range from about 0.4 to about 1. Preferred monoester products include the distilled monoester products made from fats and oils such as tallow, palm oil, cottonseed oil, soybean oil, peanut oil, sesame oil, and the like.

The powder acccording to this invention may be prepared by melt blending the ingredients until a homogeneous mass is obtained and then forming a powder from the mass. Melt blending may be accomplished by individually maintaining or raising the temperatures of the compounds to a point above their respective melting temperatures so each is a molten mass and then thoroughly blending, or by mxing the ingredients at room temperature and then raising the temperature of the mixture at least to the melting point of the highest-to-melt ingredient followed by thoroughly blending to form a homogeneous mass. Preferably, melt blending is accomplished at a temperature of between about 80° C. and 120° C. Powdering may be accomplished by conventional means such as, for example, spray chilling, freezing and pulverizing, or by any other means known in the art. Laboratory experiments indicate that the quality of product produced on small scale by powdering in a blender using dry ice is quite satisfactory. Such powdering is accomplished by first heating a mixture of the selected ingredients until a molten or liquified mass is formed, and then rapidly stirring until the mass is homogenized. For example, 100 grams of molten mixture in a 250 ml. beaker may be stirred until the mixture is found to be homogeneous. The mixture may then be poured out and cooled until solidifed, typically for about 3-4 hours at room temperature. The solid may then be powdered in a high speed stirring device such as a Waring Blendor using dry ice. The dry ice is subsequently evaporated and the powder residue sieved to an approximate size of 50-300 microns. The powder is white, free flowing, and the particles consist essentially of a homogeneous blend of the monoglycerides, propylene glycol monoesters and alkali metal salt of fatty acid.

The emulsifier is generally used in products such as cake batters at a level of about 1-5% based on the weight of flow and in products such as icings, cream fillings, whipped toppings at a level of about 1-4% based on the weight of shortening.

The following examples are submitted for a better understanding of the invention. In the examples, the powdered emulsifiers are added at the level indicated directly to cake mixes without preblending with diluents or carriers. Also, cake icings are prepared in a conventional manner using essentially totally active emulsifiers described without preblending with a carrier. The densities of the batters and icings are found to be as shown. In the examples, the cake batter, cakes, icings and cream fillings are prepared as follows:

CAKE

The recipe is as follows:

| Ingredients | Percent by wt. of flour | Parts by wt. |
|---|---|---|
| Cake flour | 100 | 200 |
| Granulated sugar | 120 | 240 |
| Milk powder | 12.5 | 25 |
| Salt | 3 | 6 |
| Baking powder | 6 | 12 |
| Salad oil (wintered cottonseed oil) | 35 | 70 |
| Water | 110 | 220 |
| Whole eggs | 50 | 100 |
| Vanilla | 1 | 2 |

CAKE -continued

The recipe is as follows:

| Ingredients | Percent by wt. of flour | Parts by wt. |
|---|---|---|
| Emulsifier | 3.5 | 7 |

The liquid ingredients are mixed together with a spoon or spatula and poured onto the solid ingredients. The liquid and solid ingredients are then mixed together with a Hobart mixer with a wire whip at No. 1 speed for ½ minute and then for 3 minutes at No. 2 speed. The result is a good, smooth batter, having densities as shown.

The batter is placed into one or more baking tins, a suitable quantity being approximately 300 grams of batter for each 8 inch baking tin. The tin or tins, as the case may be, are placed into an oven and baked for 24 minutes at 350° F. The resulting cake or cakes is or are moist and fine grained.

CREAM FILLINGS

| Ingredients | % of Powdered Sugar |
|---|---|
| Shortening (Kremit from Armour) | 64 |
| Powdered Sugar (Borden-Colonial Pure Cane Sugar - 6X) | 100 |
| Powdered Milk (Karp and Sons High Heat) | 16 |
| Marshmallow Cream (Kraft) | 16 |
| Salt | 0.75 |
| Water | 53.5 |
| Emulsifier | As Desired |

Preparation: Using a Hobart 5-quart mixer and wire whip, blend at No. 1 speed 140 grams of water and essentially totally active emulsifier for 1 minute. Add 42 grams of milk powder and continue mixing on No. 1 speed for 3 minutes. With mixer running, add 262 grams powdered sugar and 1.95 grams salt and mix for 1 minute on No. 1 speed. Stop mixer and add 42 grams marshmallow cream and mix on No. 1 speed for 1 minute. With mixer running, add shortening (168 grams mixus grams emulsifier used) and mix for 1 minute on No. 1 speed. Mix an additional 13 minutes on No. 2 speed. Determine percent overrun of cream filling by dividing the density obtained into 100. Mix cream filling an additional 5 minutes and determine the percent overrun.

ICINGS

| Ingredients | % of Powdered Sugar |
|---|---|
| Shortening (Kremit from Armour) | 25 |
| Powdered Sugar (Borden-Colonial Pure Cane Sugar - 6X) | 100 |
| Water | 20 |
| Emulsifier | As Desired |

Preparation: Using a Hobart 5-quart mixer and a paddle, blend the shortening (140 grams minus grams emulsifier used) and 560 grams of powdered sugar for 2 minutes on No. 1 speed. Add the essentially totally active emulsifier containing no carrier into blend of shortening and powdered sugar and wet the emulsifier and 112 grams of water. Mix for 2 minutes on No. 2 speed. Determine density of icing.

The results of the above examples indicate that the optimum compositions contains about 15% potassium stearate, and the ratio of propylene glycol monoesters to monoglycerides is about 1.63 to 1.

| Example | % Propylene Glycol Monoesters | % Monoglycerides (Iodine Value About 5) | % Potassium Stearate | Addition Level, (g) | Icings Density g/cc | Cake Batters Density g/cc |
|---|---|---|---|---|---|---|
| 1 (Control) | 48 | 29 | 23 | 2.52 | 1.15 | 0.98 |
| 2 | 40 | 40 | 20 | 5.0 | 1.16 | 0.68 |
| 3 | 40 | 40 | 20 | 3.0 | 1.16 | 0.68 |
| 4 | 43 | 43 | 14 | 2.76 | 1.21 | 0.61 |
| 5 (Control) | 59 | 12 | 29 | 3.4 | 1.13 | 1.02 |
| 6 | 40 | 40 | 20 | 3.0 | 1.12 | 0.65 |
| 7 | 77 | 15 | 8 | 2.6 | 1.10 | 0.98 |
| 8 | 16 | 80 | 4 | 2.5 | 1.10 | 1.17 |
| 9 | 47 | 47 | 6 | 4.2 | 1.20 | 0.92 |
| 10 | 40 | 40 | 20 | 3.0 | 1.20 | 0.72 |
| 11 (Control) | 29 | 48 | 23 | 2.52 | 1.19 | 0.60 |
| 12 | 40 | 40 | 20 | 1.0 | 1.10 | 1.0 |
| 13 | 40 | 40 | 20 | 2.0 | 1.14 | 0.73 |
| 14 | 48 | 34 | 18 | 3.48 | 1.22 | 0.72 |
| 15 | 15 | 77 | 8 | 2.6 | 1.12 | 1.10 |
| 16 | 40 | 40 | 20 | 3.0 | 1.12 | 0.60 |
| 17 | 34 | 48 | 18 | 3.48 | 1.20 | 0.68 |
| 18 (Control) | 22 | 22 | 56 | 1.8 | 1.10 | 1.11 |
| 19 | 40 | 40 | 20 | 3.0 | 1.15 | 0.66 |
| 20 (Control) | 37 | 37 | 26 | 3.24 | 1.18 | 0.74 |

Other results are illustrated in the following Examples 21-36.

| Example | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|
| % Propylene Glycol Monoester | 65 | 62 | 51 | 50 | 61.9 | 64.8 | 48.6 | 47.5 | 58.5 | 55.8 | 45.9 | 45 | 55.2 | 52.7 | 43.3 | 42.5 |
| % Monoglycerides iodine value about 5) | 35 | 38 | 49 | 50 | 33.3 | 36.2 | 46.6 | 47.5 | 31.5 | 34.2 | 44.1 | 45 | 29.7 | 32.3 | 41.6 | 42.1 |
| % Potassium Stearate | 0 | 0 | 0 | 0 | 5 | 5 | 5 | 5 | 10 | 10 | 10 | 10 | 15 | 15 | 15 | 15 |
| Batter Density (g/cc) | 1.08 | 1.08 | 1.09 | 1.10 | 0.90 | 0.94 | 0.86 | 1.0 | 0.96 | 0.80 | 0.80 | 0.81 | 0.78 | 0.66 | 0.75 | 0.70 |
| Cake Volume (ml/lb.) | 655 | 788 | 734 | 747 | 788 | 788 | 1028 | — | 8.28 | 1188 | 1162 | 1175 | 1135 | 1495 | 1135 | — |
| Addition Level (grams) | 3.0 | 2.9 | 2.55 | 2.4 | 3.0 | 2.9 | 2.55 | 2.4 | 3.0 | 2.9 | 2.55 | 2.4 | 3.0 | 2.9 | 2.55 | 2.4 |

In the above examples which are in accordance with this invention, the essentially totally active emulsifiers are found to become active by readily dispersing in the food products. The emulsifiers cause aeration of the food products as indicated by good volume, low density and desirable physical characteristics such as texture.

Unless otherwise specified, all parts, percentages, ratios, etc., are by weight.

The iodine values specified herein are measured in accordance with AOCS Official Method Cd 1-25 (rev. April, 1956), Official and Tentative Methods of the American Oil Chemists Society, 2nd ed., additions and revisions 1947 through 1963, inclusive.

The invention has been described in detail with particular reference to preferred embodiments thereof, but it will be understood that variations and modifications can be effected within the spirit and scope of the invention.

We claim:

1. A dry emulsifier composition comprising
   (a) about 20-40% by weight of monoglycerides having an iodine value of about 2-15,
   (b) about 40-70% by weight of propylene glycol monoesters, and
   (c) about 5-20% by weight of an alkali metal salt of at least one fatty acid having 8-22 carbon atoms.

2. Compositions according to claim 1 wherein the iodine value of the monoglyceride is about 4-10.

3. A dry emulsifier composition comprising
   (a) about 25-35% by weight of monoglycerides having an iodine value of about 2-15,
   (b) about 50-60% by weight of propylene glycol monoesters, and
   (c) about 12-18% by weight of an alkali metal salt of at least one fatty acid having 8-22 carbon atoms.

4. Compositions according to claim 3 wherein the iodine value of the monoglyceride is about 4-10.

5. A food product containing an emulsifying amount of the composition according to claim 1.

6. A food product containing an emulsifying amount of the composition according to claim 3.

7. Method of aerating a food product which comprises whipping into said food product an effective amount of a composition consisting essentially of
   (a) about 20-40% by weight of monoglycerides having an iodine value of about 2-15,
   (b) about 40-70% by weight of propylene glycol monoesters, and
   (c) about 5-20% by weight of an alkali metal salt of at least one fatty acid having 8-22 carbon atoms.

8. Method of aerating a food product with comprises whipping into said food product an effective amount of a composition in particulate form, the particles consisting essentially of a homogeneous blend of
   (a) about 20-40% by weight of monoglycerides having an iodine value of about 2-15,
   (b) about 40-70% by weight of propylene glycol monoesters, and
   (c) about 5-20% by weight of an alkali metal salt of at least one fatty acid having 8-22 carbon atoms.

* * * * *